US008743378B2

(12) United States Patent
Kaneko et al.

(10) Patent No.: US 8,743,378 B2
(45) Date of Patent: Jun. 3, 2014

(54) APPARATUS AND METHOD FOR MEASURING CYLINDRICALLY-SHAPED OBJECT AND APPARATUS FOR INSPECTING TIRE APPEARANCE

(75) Inventors: Tomoyuki Kaneko, Tokyo (JP); Norihiro Honda, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 561 days.

(21) Appl. No.: 12/988,577

(22) PCT Filed: Apr. 23, 2009

(86) PCT No.: PCT/JP2009/001869
§ 371 (c)(1),
(2), (4) Date: Nov. 29, 2010

(87) PCT Pub. No.: WO2009/133674
PCT Pub. Date: Nov. 5, 2009

(65) Prior Publication Data
US 2011/0102811 A1     May 5, 2011

(30) Foreign Application Priority Data
May 1, 2008   (JP) ................................. 2008-119657

(51) Int. Cl.
| | |
|---|---|
| *G01B 11/14* | (2006.01) |
| *G01B 11/08* | (2006.01) |
| *G01B 11/245* | (2006.01) |
| *G01B 11/06* | (2006.01) |
| *G01M 17/02* | (2006.01) |

(52) U.S. Cl.
CPC .............. *G01B 11/08* (2013.01); *G01B 11/245* (2013.01); *G01B 11/0608* (2013.01); *G01M 17/027* (2013.01)
USPC ...................................................... 356/625

(58) Field of Classification Search
CPC .. G01B 11/08; G01B 11/245; G01B 11/0608; G01M 17/027
USPC ........................................................ 356/625
See application file for complete search history.

(56) References Cited

U.S. PATENT DOCUMENTS

2009/0049902 A1*   2/2009   Mizuno et al. .................. 73/146

FOREIGN PATENT DOCUMENTS

EP         1 808 686 A1      7/2007
(Continued)

OTHER PUBLICATIONS

International Search Report issued in Application No. PCT/JP2009/001869; Dated Jun. 16, 2009 (With Translation).

(Continued)

*Primary Examiner* — Tarifur Chowdhury
*Assistant Examiner* — Sunghee Y Gray
(74) *Attorney, Agent, or Firm* — Oliff PLC

(57) ABSTRACT

A measuring apparatus for automatically measuring the height, the dimensions of the inner and outer surfaces, and the shape of a cylindrically-shaped object. The measuring apparatus includes a measuring head vertically moving along a positioning guide supported by a support post integral with a measuring table, a height displacement measuring device, which comprises a laser distance meter provided on the measuring table, and an arithmetic processing unit. The measurement starts as the measuring head is raised by a weight from a measuring start position of the measuring table. The inner and outer surfaces of a tire are measured based on the measurements by an inner surface measuring device provided with three laser distance meters mounted to the measuring head and an outer surface measuring device having a laser distance meter and the displacement change measurement of the measuring head by the height displacement measuring device. Required dimensional values are calculated from the measured values, using the arithmetic processing unit.

7 Claims, 10 Drawing Sheets

(56) References Cited

FOREIGN PATENT DOCUMENTS

| JP | A-52-037464 | 3/1977 |
| JP | 52-88054 | 7/1977 |
| JP | A-52-088053 | 7/1977 |
| JP | A-01-195309 | 8/1989 |
| JP | A-02-107909 | 4/1990 |
| JP | A-02-122211 | 5/1990 |
| JP | A-07-039827 | 2/1995 |
| JP | A-2003-050123 | 2/2003 |
| JP | A 2003-84087 | 3/2003 |
| JP | A 2006-194819 | 7/2006 |

OTHER PUBLICATIONS

European Search Report issued in Application No. 09738611.4; Dated Apr. 10, 2012.

Nov. 15, 2013 Office Action issued in Japanese Patent Application No. 2010-510026; with English-language translation.

* cited by examiner

TIRE DIMENSIONS TO BE CALCULATED

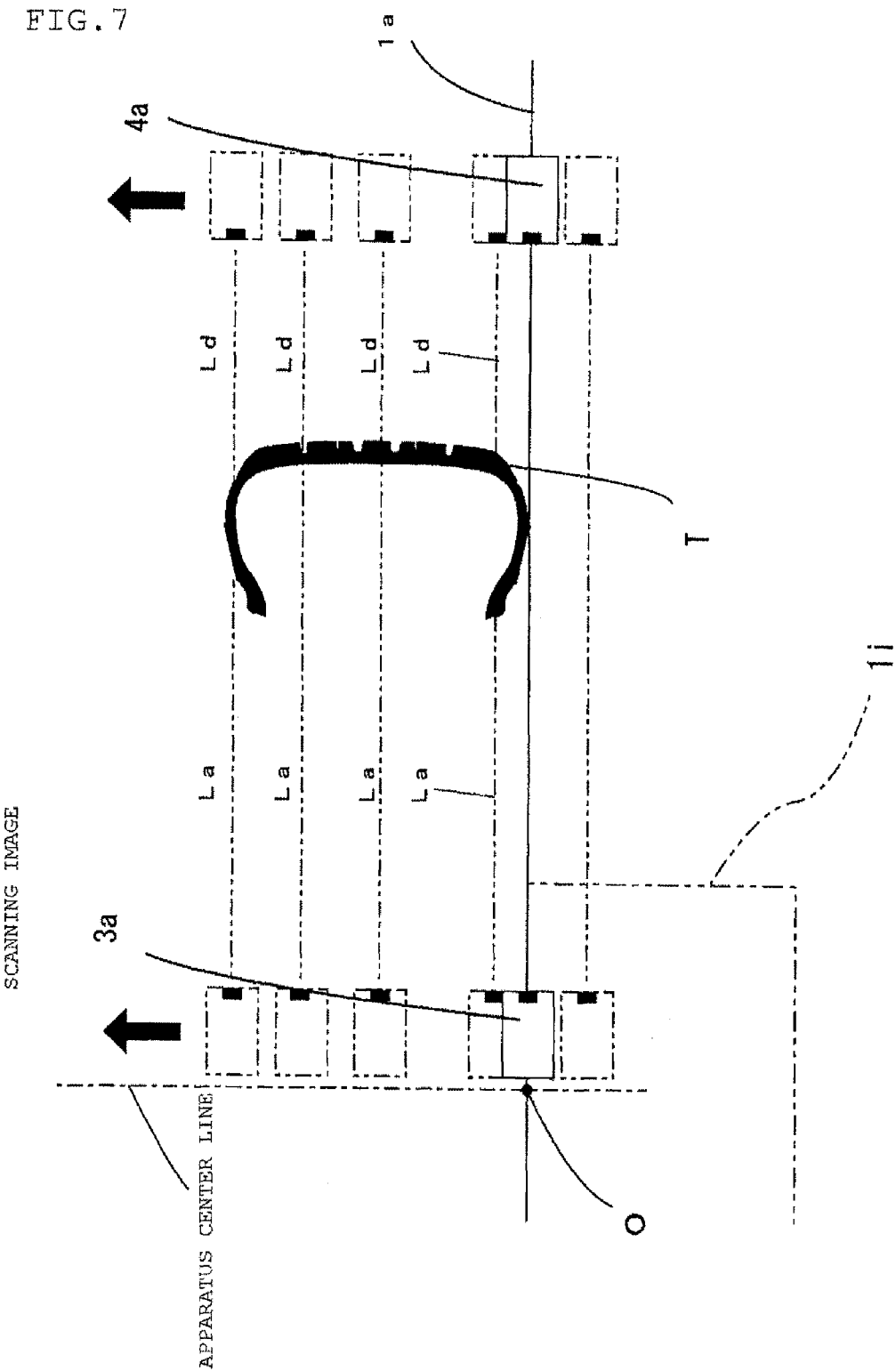

OUTPUT DATA OF DISTANCE SENSOR 4a

OUTPUT DATA OF DISTANCE SENSOR 3a (3b,3c)

APPARATUS AND METHOD FOR MEASURING CYLINDRICALLY-SHAPED OBJECT AND APPARATUS FOR INSPECTING TIRE APPEARANCE

TECHNICAL FIELD

The present invention relates to measurement of the dimensions and shape of a cylindrically-shaped object and, more particularly, to an apparatus for automatically measuring and calculating the dimensions and shape of a tire, for instance.

BACKGROUND ART

In the past, when the dimensions of a tire were to be measured, the dimensions of the parts of the tire have been measured manually using a ruler, set square, tape measure, or the like. Also, as a way of measuring the dimensions of a tire, there has been a method as proposed in Reference 1, in which an image processing is performed using a CCD camera and the tire is identified by comparing a specific pattern obtained by the image processing against a plurality of patterns having been stored in an identification device beforehand.

CONVENTIONAL ART DOCUMENT

Patent Document

Reference 1: Japanese Unexamined Patent Application Publication No. 7-39827

SUMMARY OF THE INVENTION

Problems to be Solved by the Invention

However, in the manual measurement using a ruler or other measuring instrument, measurement variations, such as an error in reading the measuring instrument or an error in positioning the measuring instrument on an object to be measured, are inevitable, and besides the measurement can take long hours. Moreover, since such a measurement is done by contact, the tire measurement, for instance, has been prone to problems of erroneous measurements due to deformation of the tire. Also, the necessity to separately input the measured dimensions to a recording medium has an eventuality of failure or errors in inputting them.

Also, the method as proposed in Reference 1 may help avoid errors due to manual operation, but requires inputting in advance of dimensional patterns or the like of the tire in the identification device. Therefore, information on the tire dimensions cannot be obtained easily.

The present invention, which has been made to solve the above-mentioned problems, provides a measuring apparatus and method capable of automatically measuring the dimensions and shape of tires accurately.

Means for Solving the Problem

According to a first aspect of the present invention, an apparatus for measuring a cylindrically-shaped object includes a measuring head, an inner surface measuring device, which is held by the measuring head and has a plurality of first distance sensors disposed radially with respect to the shaft center of the measuring head, for measuring distance to the hollow inner surface of the object, an outer surface measuring device, which is held by the measuring head, disposed in the same plane as the inner surface measuring device and positioned at a predetermined distance outward from the region enclosed by the first distance sensors, and provided with a second distance sensor for measuring distance from the second distance sensor to the outer surface of the object, a displacement measuring device provided with a third distance sensor for measuring displacement in the height direction of the measuring head, a position calculating means for calculating the center position of the object based on outputs of the inner surface measuring device, and a dimensions calculating means for calculating dimensions of the object based on the results of output from the position calculating means and the results of measurement output from the outer surface measuring device and the displacement measuring device. Accordingly, it is possible to measure the dimensions of an object to be measured. In particular, if the plurality of first distance sensors to be arranged radially are three sensors, then necessary and sufficient measurements of the inner surface of the object can be performed with a minimal number of distance sensors. Also, the center of the object can be derived by processing the measured values of the three distance sensors by a position calculating means. Further, it is possible to measure the various dimensions of the object through the processings by a dimensions calculating means using the measured values of the inner surface measuring device, the outer surface measuring device, and the displacement measuring device and the center of the object determined by the position calculating means. A computer may be used to serve as the position calculating means and the dimensions calculating means. Then it will be possible to perform calculations and arithmetic processings and output the results on a monitor simultaneously with measurement, which will realize visualized measurements.

In another embodiment of the first aspect of the present invention, the apparatus for measuring a cylindrically-shaped object includes a measuring head, an inner surface measuring device, which is held by the measuring head and has a plurality of first distance sensors disposed radially with respect to the shaft center of the measuring head, for measuring distance to the hollow inner surface of the object, an outer surface measuring device, which is held by the measuring head, disposed in the same plane as the inner surface measuring device and positioned at a predetermined distance outward from the region enclosed by the first distance sensors, and provided with a second distance sensor for measuring distance from the second distance sensor to the outer surface of the object, a displacement measuring device provided with a third distance sensor for measuring displacement in the height direction of the measuring head, and a shape measuring means for measuring the shape of the object from the results of measurement by the inner surface measuring device, the outer surface measuring device, and the displacement measuring device. Accordingly, it is possible to measure the shape of an object to be measured. In particular, if the plurality of first distance sensors to be arranged radially are three sensors, then necessary and sufficient measurements of the inner surface of the object can be performed with a minimal number of distance sensors. Also, it is possible to determine the shape of the inner surface of the object from the measured values of the inner surface measuring device and the displacement measuring device and the shape of the outer surface of the object from the measured values of the outer surface measuring device and the displacement measuring device. A computer may be used to serve as the shape measuring means which processes the results of measurement by the inner surface measuring device, the outer surface measuring device, and the displacement measuring device. Then it will be possible to output the shape of the object on a monitor simultaneously with measurement.

In another embodiment of the first aspect of the present invention, the measuring apparatus has a laser distance meter as at least one of the first, second, and third distance sensors. Accordingly, the distance to the measurement point can be measured instantaneously. If laser distance meters are employed for all of the distance sensors, it will be possible to measure the distance accurately at all the measurement points.

In another embodiment of the first aspect of the present invention, the measuring apparatus has a measuring head which is provided with a vertical motion means and can travel from the lower end to the upper end of the object in the vertical axis direction thereof. Accordingly, it is possible to measure the shape and dimensions of the inner surface and outer surface of the object three-dimensionally. In particular, the measurements of the shape and dimensions of the inner surface can be performed easily. Also, if a weight or the like is used as the motion means to cause the travel of the measuring head, then there will be no need to use a motive power for the measurement. This will make the installation and movement of the measuring apparatus easier.

In another embodiment of the first aspect of the present invention, the measuring apparatus performs synchronous measurements by the first, second, and third distance sensors. Accordingly, the measured values obtained by all the distance sensors have the same temporal sequence. This will allow the processing of the measured values in time with the progress of measurement, for instance.

In another embodiment of the first aspect of the present invention, an apparatus for inspecting tire appearance includes a measuring apparatus configured as described above.

An apparatus for inspecting tire appearance as described herein may be so configured as to inspect tire appearance based on highly accurate images obtained with a camera focused on the surface of a tire. This allows accurate measurement of tire dimensions (especially the outer diameter and inner diameter of a tire), thus improving the precision of tire appearance inspection. Also, in the inspection of tire appearance, it is necessary to introduce a camera into the interior of the tire to measure the inner surface of the tire. In such a case, when the dimensional measurement of the tire is done improperly, the camera can come into contact with the tire, which may cause damage to the camera. Therefore, use of an apparatus capable of measuring tire dimensions properly will prevent the camera from sustaining damage.

A second aspect of the present invention provides a method for measuring a cylindrically-shaped object, which comprises the steps of measuring distance from a plurality of first distance sensors to the hollow inner surface of the object by an inner surface measuring device which is held by a measuring head and has the first distance sensors disposed radially with respect to the shaft center of the measuring head, measuring distance from a second distance sensor to the outer surface of the object by an outer surface measuring device which is held by the measuring head, is disposed in the same plane as the inner surface measuring device, and has a second distance sensor positioned at a predetermined distance outward from the region enclosed by the first distance sensors, measuring displacement of the measuring head in the height direction by a third distance sensor, calculating the center position of the object from the results of measurement by the inner surface measuring device, and calculating dimensions of the object based on the calculated center position of the object and the results of measurement by the outer surface measuring device and the third distance sensor. Accordingly, it is possible to measure the dimensions of an object to be measured. In particular, if the plurality of first distance sensors to be arranged radially are three sensors, then necessary and sufficient measurements of the object can be performed with a minimal number of distance sensors. Also, the center of the object can be derived by performing an arithmetic processing on the measured values from the step of measuring the inner surface by the inner surface measuring device. Also, it is possible to measure the dimensions of the object in the axial height direction by synchronizing the steps of measuring the inner surface, the outer surface, and the displacement. A computer may be used in the steps of performing position calculation and other arithmetic processings. Then it will be possible to output the results of the steps of performing position calculation and other arithmetic processings on a monitor simultaneously with measurement, which will realize visualized measurements.

Another embodiment of the second aspect of the present invention provides a method for measuring a cylindrically-shaped object, which comprises the steps of measuring distance from a plurality of first distance sensors to the hollow inner surface of the object by an inner surface measuring device which is held by a measuring head and has the first distance sensors disposed radially with respect to the shaft center of the measuring head, measuring distance from a second distance sensor to the outer surface of the object by an outer surface measuring device which is held by the measuring head, is disposed in the same plane as the inner surface measuring device, and has a second distance sensor positioned at a predetermined distance outward from the region enclosed by the first distance sensors, measuring displacement of the measuring head in the height direction by a third distance sensor, and measuring the shape of the object from the results of measurement by the inner surface measuring device, the outer surface measuring device, and the displacement measuring device. Accordingly, it is possible to measure the dimensions and shape of an object to be measured. In particular, if the plurality of first distance sensors to be arranged radially are three sensors, then necessary and sufficient measurements of the inner surface of the object can be performed with a minimal number of distance sensors. Also, it is possible to measure the shape of the object in the axial height direction by synchronizing the steps of measuring the inner surface, the outer surface, and the displacement. A computer may be used in the step of determining the shape of the object. Then it will be possible to output the shapes of the inner surface and the outer surface of the object on a monitor simultaneously with measurement.

BRIEF DESCRIPTION OF THE DRAWINGS

FIG. 7 is a conceptual diagram of measurement by laser distance meters.

BEST MODE FOR CARRYING OUT THE INVENTION

Figure 1:
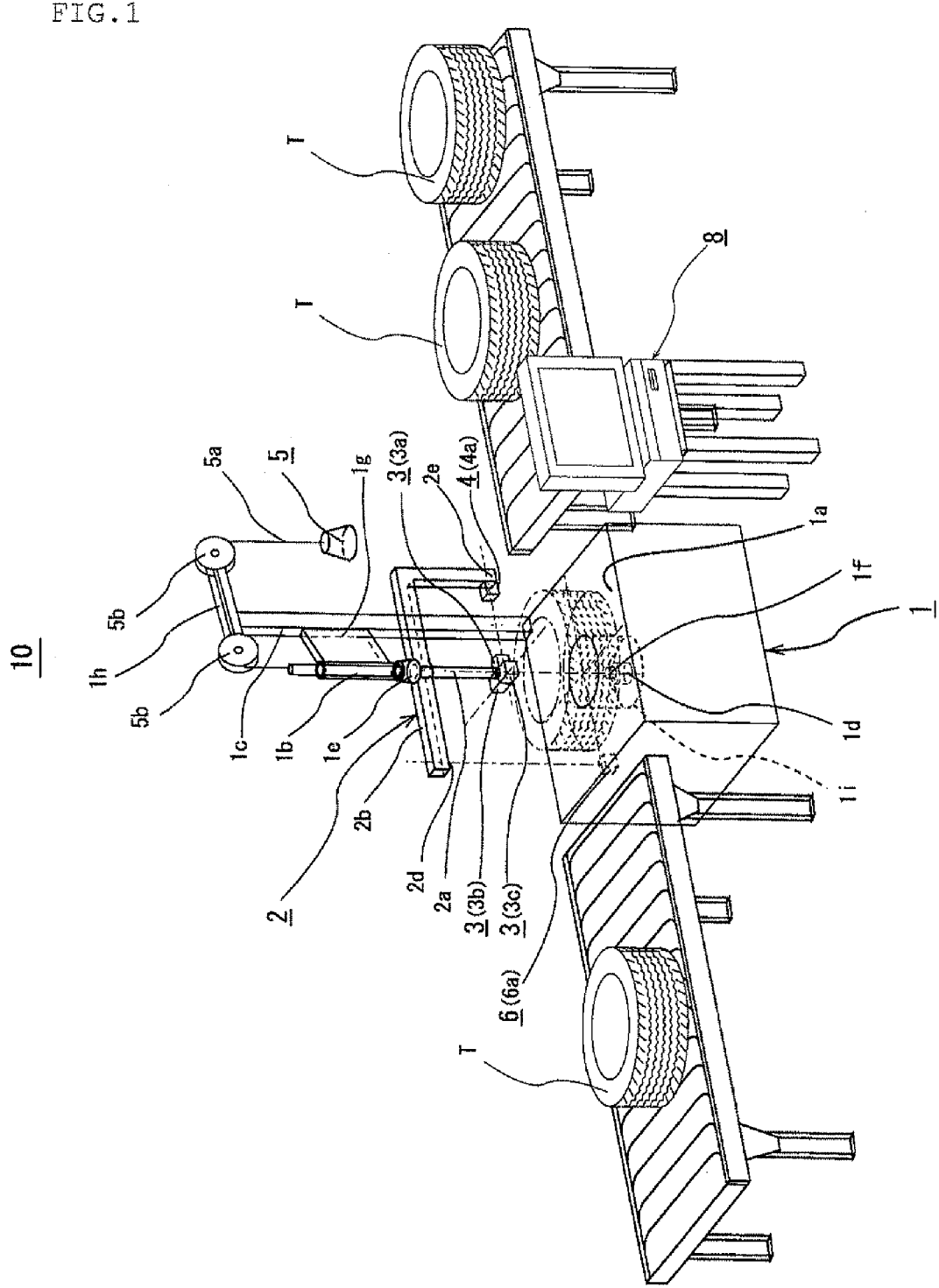
FIG. 1 is an external view of a measuring apparatus according to a preferred embodiment of the present invention.
Figure 2:
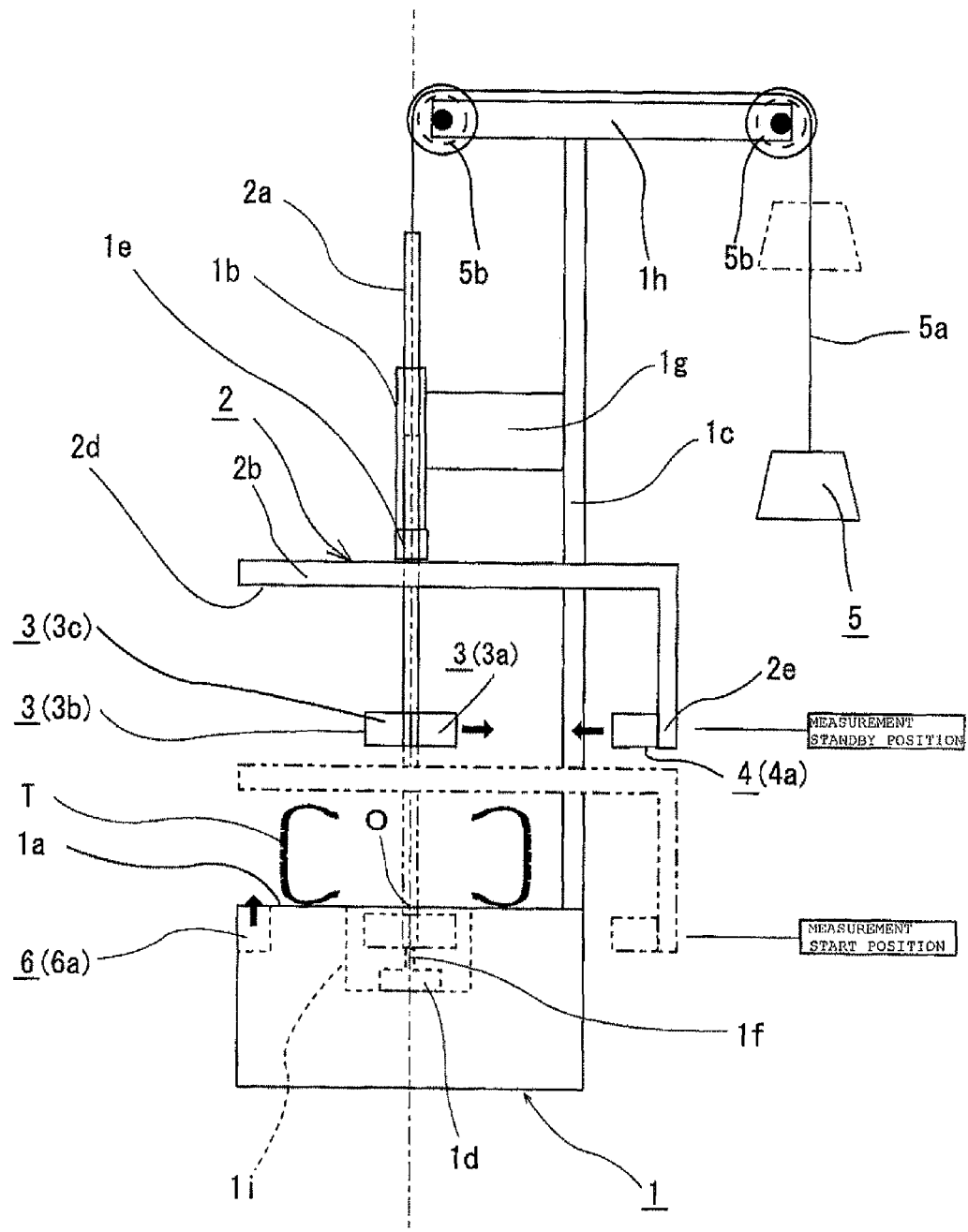
FIG. 2 is a configuration diagram of a measuring apparatus according to a preferred embodiment of the present invention.

FIG. 1 is an external view of a measuring apparatus for measuring dimensions and shapes according to the present invention, and FIG. 2 is a configuration diagram of the measuring apparatus for measuring dimensions and shapes. The measuring apparatus 10 includes a measuring table 1, a measuring head 2, and an arithmetic processing unit 8.

The measuring table 1 has a placement surface 1$a$ on which a cylindrically-shaped object T, such as a tire, is placed, a height displacement measuring device 6, a lower stopper 1$d$, and a support post 1$c$. The placement surface 1$a$ is located on the topside of the measuring table 1 and has a recess 1$i$ in the center thereof. The recess 1$i$ has a lower stopper 1$d$ disposed therein. The support post 1$c$, which extends vertically in a lateral position of the measuring table 1, has a guide support stay 1$g$ and a pulley stay 1$h$ attached thereto. The guide support stay 1$g$ is fixed to the support post 1$c$ at one end thereof and has a positioning guide 1$b$ fixed to the other end thereof. The positioning guide 1$b$, which is a cylinder extending vertically with respect to the placement surface 1$a$, is so fixed that the center axis of the cylinder is vertical to the placement surface 1$a$. The point where the extension of the center axis of the positioning guide 1$b$ intersects with the placement surface 1$a$ is the hypothetical measurement origin O to be described later, which serves as reference for measurements according to the present invention.

Also, the pulley stay 1$h$, which is provided at the upper end of the support post 1$c$, extending orthogonally to the support post 1$c$, has pulleys 5$b$ and 5$b$ disposed at both ends thereof. A wire rope 5$a$ is run over the pulleys 5$b$ and 5$b$, and one end thereof has a counter weight 5 attached thereto and the other end thereof is attached to an end of the measuring head 2. Thus, the measuring head 2 is movable vertically along the positioning guide 1$b$. Also, the weight of the counterweight 5 serves as motive power for the travel of the measuring devices of the present invention.

The measuring head 2 consists of a measuring head support shaft 2$a$ and an outer surface measuring device support arm 2$b$. The measuring head support shaft 2$a$ extends perpendicular to the placement surface 1$a$ with one end thereof coupled to the wire rope 5$a$ and the other end thereof provided with an inner surface measuring device 3. The outer surface measuring device support arm 2$b$, which is L-shaped, is combined integrally with the measuring head support shaft 2$a$ such that the longer section of the L shape is in parallel with the placement surface 1$a$. An end of the longer section of the L shape is formed as a non-measuring end 2$d$ corresponding in position to the height displacement measuring device 6 to be described later. The shorter section of the L shape, which extends perpendicular to the placement surface 1$a$, has an outer surface measuring device 4 provided at the end thereof.

Figure 3:
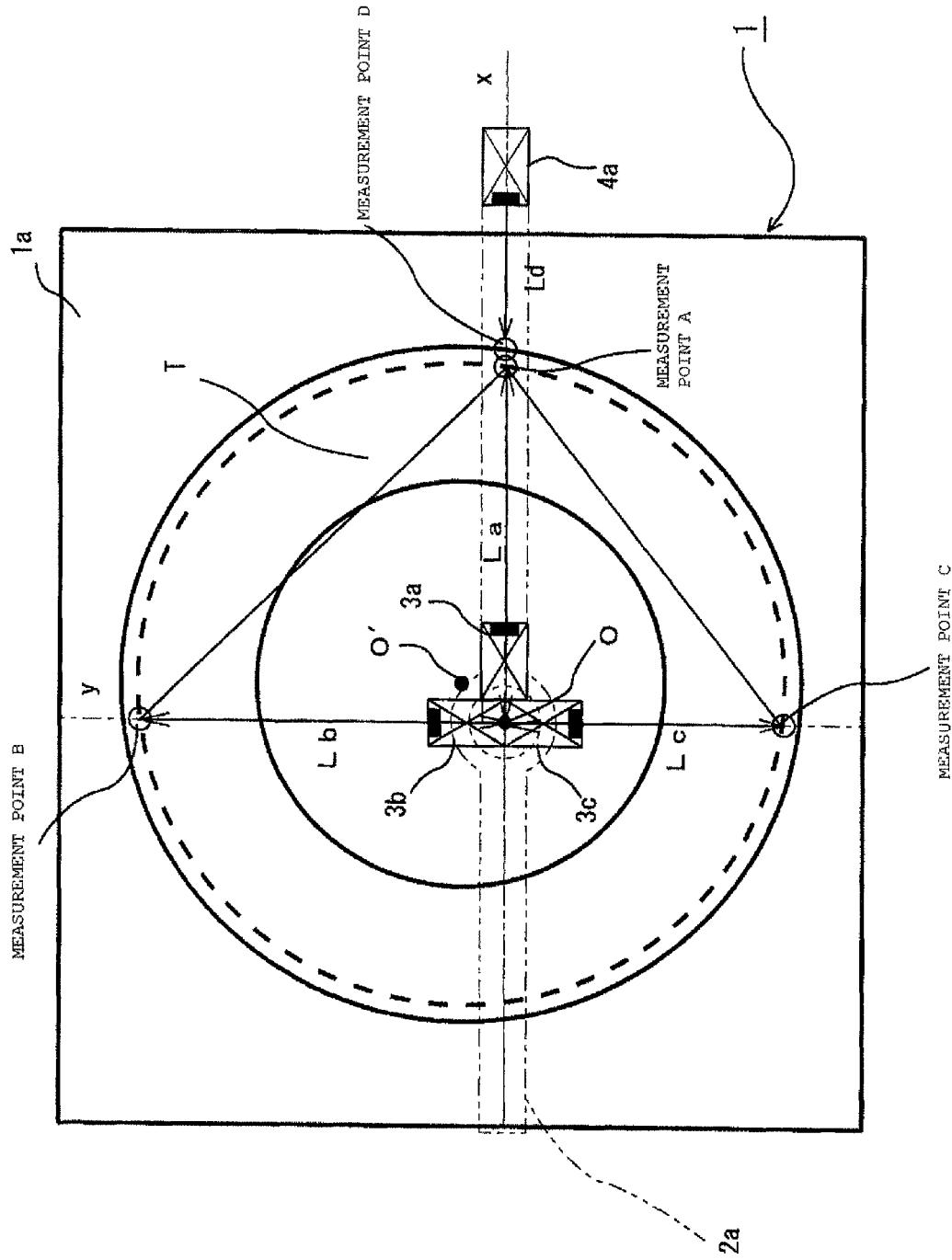
FIG. 3 is an arrangement plan of distance sensors according to a preferred embodiment of the present invention.

FIG. 3 shows an arrangement of distance sensors constituting an inner surface measuring device 3 and an outer surface measuring device 4 according to the present invention.

Figure 4A:
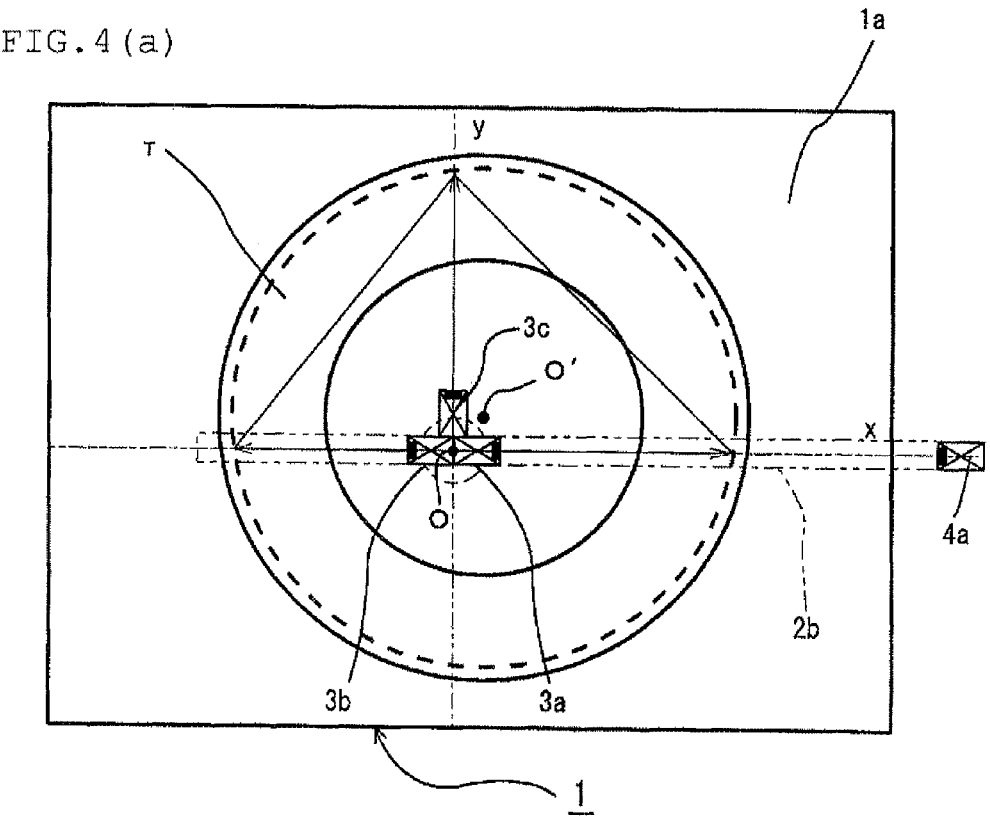
FIG. 4 is arrangement plans of measuring sensors according to preferred embodiments of the present invention.
Figure 4B:
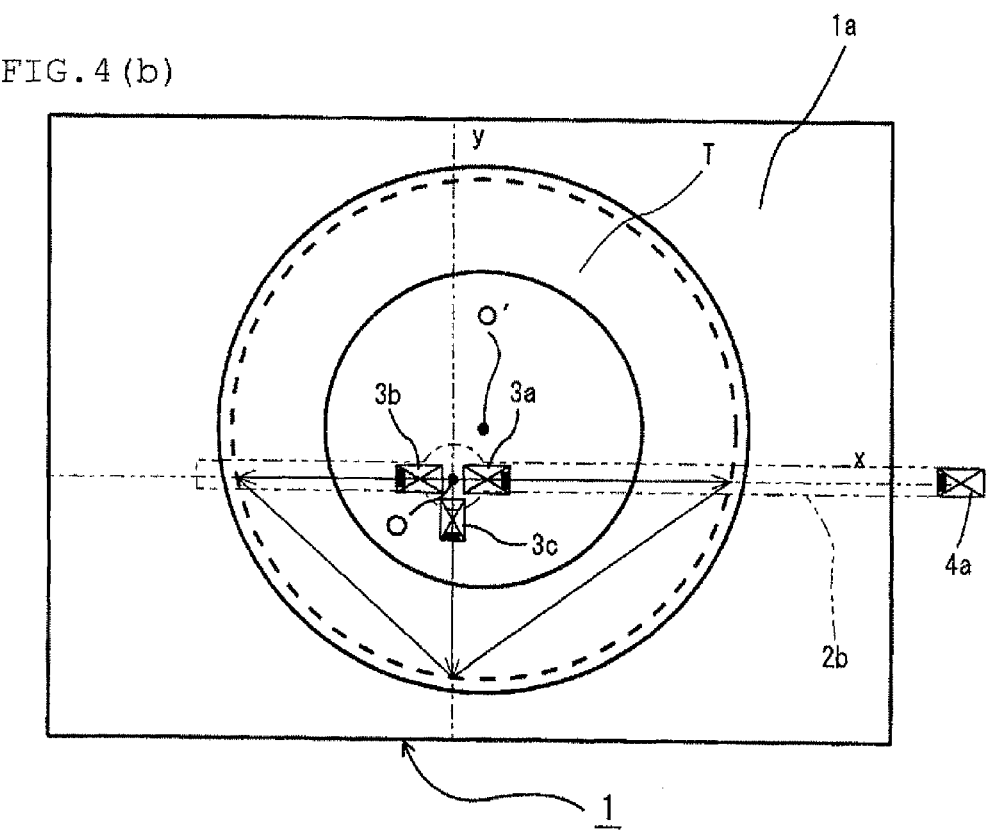

The inner surface measuring device 3 is constructed of three laser distance meters, namely, a laser distance meter 3$a$, a laser distance meter 3$b$, and a laser distance meter 3$c$. The laser distance meters 3$a$, 3$b$, 3$c$ are arranged such that their directions of measurement are radial with respect to the measuring head support shaft 2$a$ and in the same plane with each other. Of the laser distance meters 3$a$, 3$b$, 3$c$ of the inner surface measuring device 3, the laser distance meter 3$a$, for example, is mounted with its direction of measurement facing the outer surface measuring device 4. The other two laser distance meters 3$b$ and 3$c$ are so arranged that their directions of measurement are opposite to each other and are at right angles to that of the laser distance meter 3$a$. For example, the arrangement may be such that, as shown in FIG. 4A, the laser distance meter 3$a$ and the laser distance meter 3$b$ are placed symmetrically to each other with respect to the y-axis whereas the laser distance meter 3$c$ is placed at right angles to the laser distance meters 3$a$ and 3$b$. Also, as shown in FIG. 4B, the laser distance meters 3$a$ to 3$c$ may be placed such that they are spaced apart from each other by a predetermined distance. In other words, the important point in arranging the laser distance meters 3$a$, 3$b$, 3$c$ as the inner surface measuring device 3 is determining in advance the location and orientation of the laser distance meters 3$a$, 3$b$, 3$c$ with respect to the measurement origin O and setting them in such a manner that the directions of measurement are in the same plane with each other and facing outward radially.

The outer surface measuring device 4 is constructed of a laser distance meter 4$a$. The laser distance meter 4$a$ is disposed in such a manner that the direction of measurement is in the same plane as those of the laser distance meters 3$a$, 3$b$, 3$c$ serving as the inner surface measuring device 3 and is facing that of the laser distance meter 3$a$ as shown in FIG. 3. In the present embodiment, the laser distance meter 3$a$ as the inner surface measuring device 3 and the laser distance meter 4$a$ as the outer surface measuring device 4 are arranged such that they are apart from each other by a distance equal to or more than the radius of a tire T.

The height displacement measuring device 6 is constructed of a laser distance meter 6$a$. The laser distance meter 6$a$ is fixed within the measuring table 1 such that it does not protrude above the placement surface 1$a$ and its direction of measurement is toward the non-measuring end 2$d$ of the outer surface measuring device support arm 2$b$. This configuration allows measurement of the displacement in the tire height direction as the measuring head 2 is moved vertically.

In other words, it is possible to determine the shape of a tire changing in the height direction by making the measured values obtained by the inner surface measuring device 3 and the outer surface measuring device 4 correspond to the displacement of the tire T in the height direction measured by the height displacement measuring device 6.

Figure 10:
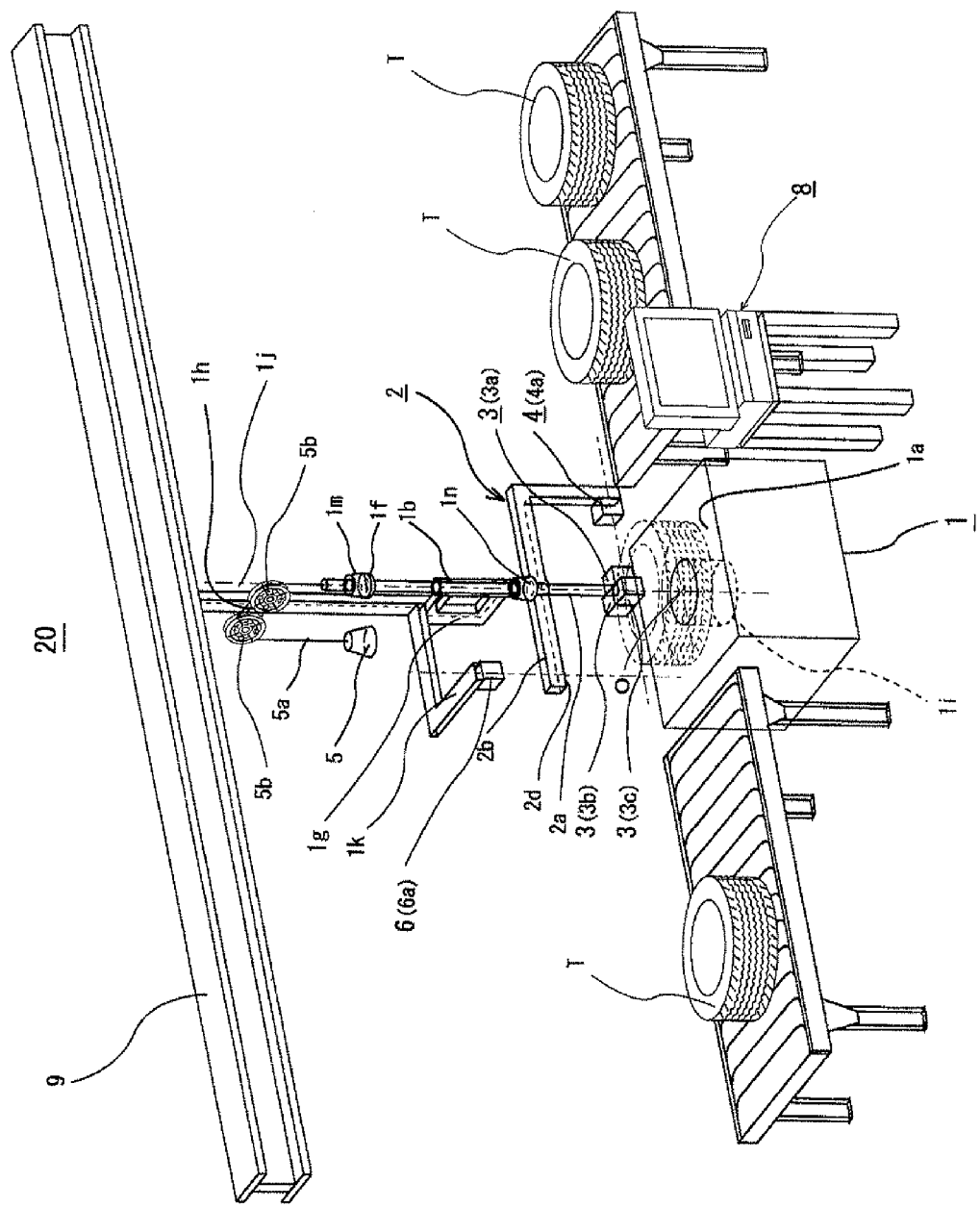
FIG. 10 is a configuration diagram of a measuring apparatus according to another embodiment of the present invention.

It is to be noted that although the height displacement measuring device 6 herein is installed within the measuring table 1, it may be installed in any other position which allows measurement of displacement in the height direction along with the travel of the measuring head 2 (see FIG. 10).

Note also that although the distance measuring sensors used in the inner surface measuring device 3, the outer surface measuring device 4, and the height displacement measuring device 6 are all laser distance meters in the present embodiment, they are not limited thereto, but may also be other types of distance sensors.

The measurements according to the above-described arrangement are done such that all the laser distance meters 3$a$, 3$b$, 3$c$ of the inner surface measuring device 3, the laser distance meter 4$a$ of the outer surface measuring device 4, and the laser distance meter 6$a$ of the height displacement measuring device 6 perform the measurements in synchronism with each other, and the measured values obtained by the laser distance meters 3a, 3b, 3c, 4a, and 6a are transferred in the same temporal sequence to the arithmetic processing unit 8.

Figure 5:
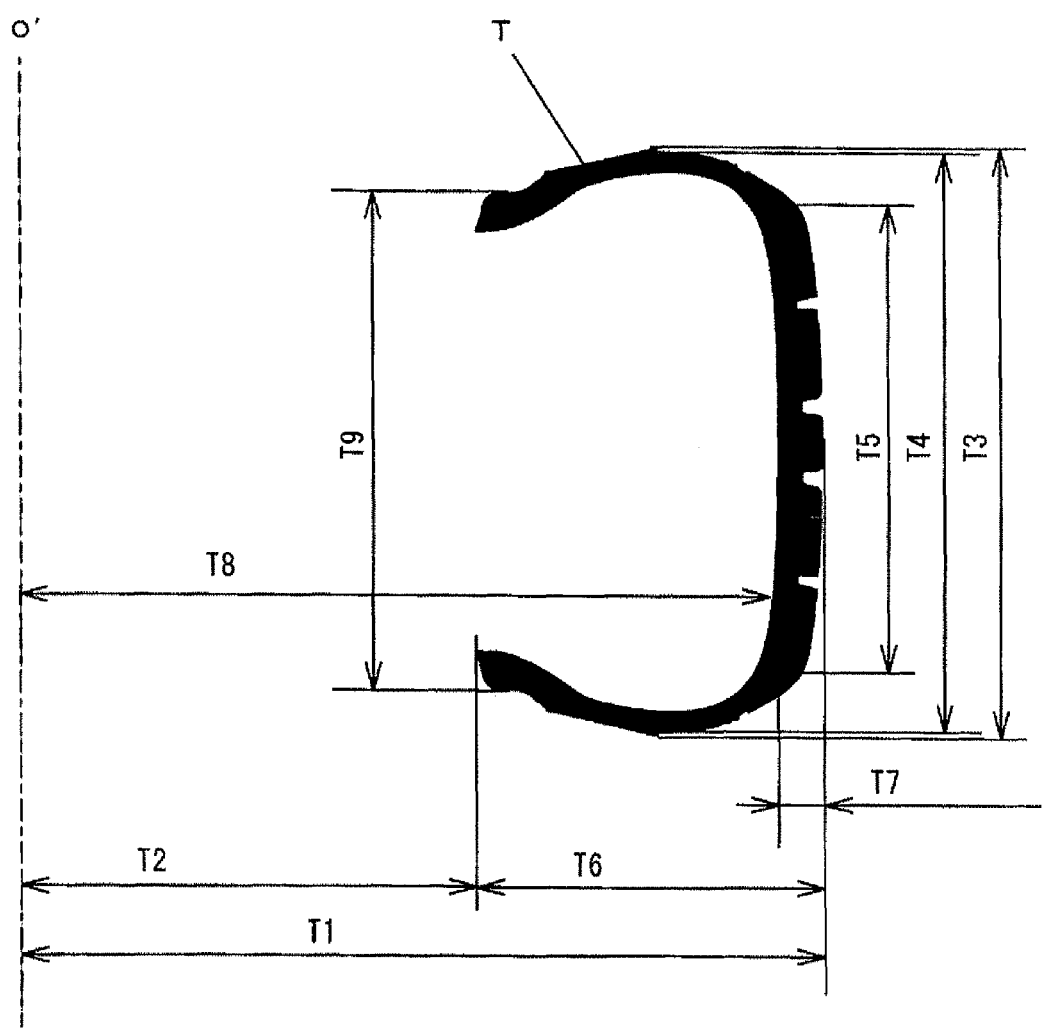
FIG. 5 is a diagram showing tire dimensions to be calculated.

FIG. 5 shows the dimensional positions that can be determined by the measured dimensions and the calculated dimensions of a tire.

Even when there is a disagreement between the center O of a tire T and the measurement origin O in the dimensional measurement of the tire, the arithmetic processing unit 8, which stores in its memory formulas for computation to automatically determine the tire center O', calculates the dimensions of the respective parts based thereon.

For example, outer tire radius T1, inner tire radius T2, total tire width T3, tire sectional width T4, tire tread width T5, tire height T6, tire tread thickness T7, and the like as shown in FIG. 5 are calculated automatically to determine the dimensions. In the present embodiment, the arithmetic processing unit 8 used is a computer, and the dimensional measurement of a tire is done with the help of computational formulas and the like stored therein. However, any arithmetic processing unit other than a computer may be used if it is equipped with input/output, computation, and storage functions. That is, any apparatus equipped with the functions, such as input, processing, computation, storage, and output of information outputted from all the aforementioned laser distance meters 3a, 3b, 3c, 4a, and 6a as well as control of each of the laser distance meters 3a, 3b, 3c, 4a, and 6a, can perform the measurement of the dimensions and shape of the object automatically in the same way as in the present embodiment.

FIG. 10 shows a configuration of a measuring apparatus according to another embodiment. Note that the same components as those in the previously described embodiment are denoted with the same reference numerals as those therein, and the description thereof will be omitted.

In this embodiment a support member 1j is fixed to a rail 9 at one end thereof and extends toward a placement surface 1a. The support member 1j has a pulley stay 1h and a guide support stay 1g in the same way as in the previously described embodiment and is equipped additionally with a displacement measuring device support arm 1k. Attached to the guide support stay 1g is a positioning guide 1b, which supports a measuring head 2. Also, one end of a wire rope 5a run over pulleys 5b and 5b, which are attached to both ends of the pulley stay 1h, is attached to the measuring head 2, and the other end thereof is attached to a counterweight 5 to move the measuring head vertically. The displacement measuring device support arm 1k supports a height displacement measuring device 6 whose direction of measurement is facing a measuring table 1. The height displacement measuring device 6 measures the displacement of the measuring head 2 from above. A measuring head support shaft 2a supporting the measuring head 2 is provided with stoppers above and below the positioning guide 1b which is located therebetween. The upside stopper 1m is a positioning stopper that sets the measurement start position for measurement by the measuring head 2, whereas the downside stopper 1n is a positioning stopper that sets the measurement end position thereof. The upside stopper 1m is provided with a switch 1f on the lower surface thereof. The switch 1f is pushed as the upside stopper 1m comes into contact with the positioning guide 1b when the measuring head 2 is pushed down to the measurement start position. The switch 1f, as it is released, sends a signal of measurement start to an arithmetic processing unit 8. The measurement procedure from here on is the same as that for the previously described embodiment. A measuring apparatus 20 in the present embodiment can also perform measurements in the same way as in the previously described embodiment. As necessary conditions therefor, however, the placement surface 1a of the measuring table 1, on which the object to be measured is placed, must be provided with a recess 1i, which allows the inner surface measuring device 3 provided on the measuring head 2 to be located on a level with the placement surface 1a, and the measuring table 1 must be of such size that the outer surface measuring device 4 in this condition may not come in contact with the measuring table 1.

Figure 6:
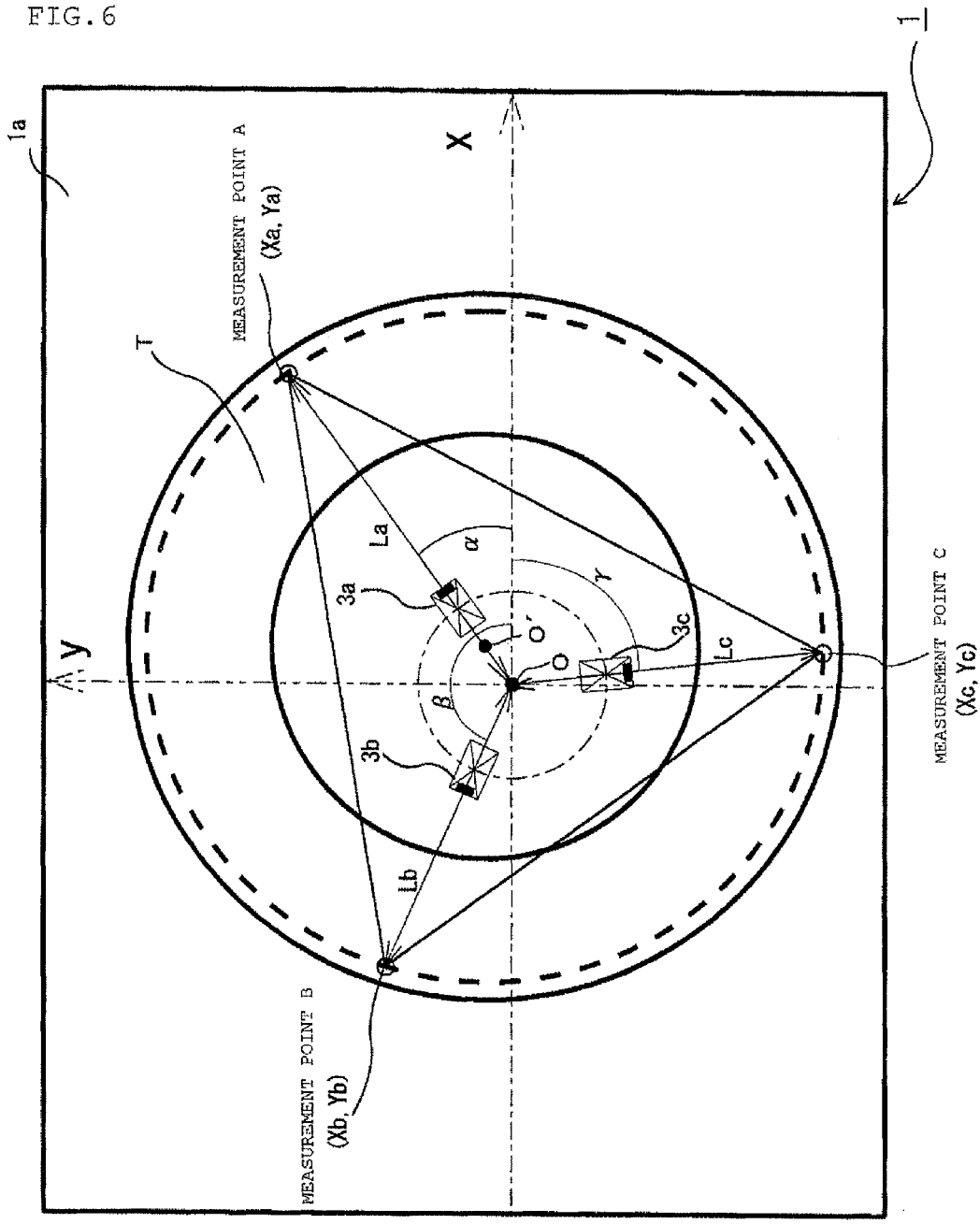
FIG. 6 is a diagram showing a generalized concept of calculation for deriving tire center from an arrangement of measuring sensors.

FIG. 6 shows a concept of a generalized calculation method for calculating the center O' of a tire as an object to be measured, with the directions of measurement by three laser distance meters 3a, 3b, 3c arranged radially.

Based on the arrangement of the laser distance meters, the positions of measurement points A, B, and C can be obtained easily from the measured values determined by the laser distance meters 3a, 3b, 3c.

Computational formulas for finding the center O' of a tire T from the measured values determined by the inner surface measuring device 3 will be explained hereinbelow. Generally, the center of a circle is found by identifying the positions of at least three points on the same circumference. Let measurement point A, measurement point B, and measurement point C represent the measurement points on the inner surface of a tire T in the measurement by the three laser distance meters 3a, 3b, 3c, respectively. As shown in FIG. 6, let La, Lb, and Lc represent the sums of the distance from the laser distance meters 3a, 3b, 3c to the measurement points A, B, and C, as measured by the laser distance meters 3a, 3b, 3c of the inner surface measuring device 3, and the distance from the measurement origin O to the laser distance meters 3a, 3b, 3c, respectively. Let $\alpha$, $\beta$, and $\gamma$ (where $-\pi \leq \alpha, \beta, \gamma \leq \pi$) represent the included angles between the straight line connecting the measurement origin O with the measurement points A, B, and C, respectively, and the positive direction of the x-axis. Also, the positive direction of the y-axis is the direction on the counterclockwise side from the positive direction of the x-axis.

If each of the measurement point A, measurement point B, and measurement point C is on the circumference of the same circle, then the positions of the measurement points A, B, and C, as measured by the laser distance meters 3a, 3b, 3c from the measurement origin O can be expressed as follows:

Measurement point A as measured by laser distance meter 3a:

$$A(Xa, Ya) = A(La \times \cos\alpha, La \times \sin\alpha)$$

Measurement point B as measured by laser distance meter 3b:

$$B(Xb, Yb) = B(Lb \times \cos\beta, Lb \times \sin\beta)$$

Measurement point C as measured by laser distance meter 3c:

$$C(Xc, Yc) = C(Lc \times \cos\gamma, Lc \times \sin\gamma)$$

Thus, if the center of a tire T to be found is denoted by tire center O' (X, Y), then the distance from the tire center O' to measurement point A, the distance from the tire center O' to measurement point B, and the distance from the tire center O' to measurement point S are all the same.

Therefore, first from the relationship of O'A=O'B, a straight line which is an equal distance from measurement point A and measurement point B can be expressed as:

$$a1X + b1Y + c1 = 0$$

where $a1 = 2(Xa - Xb)$, $b1 = 2(Ya - Yb)$, and $c1 = Xb2 - Xa2 + Yb2 - Ya2$.

Next, similarly from the relationship of O'B=O'C, a straight line which is an equal distance from measurement point B and measurement point C can be expressed as:

$$a2X + b2Y + c2 = 0$$

where $a2 = 2(Xb - Xc)$, $b2 = 2(Yb - Yc)$, and $c2 = Xc2 - Xb2 + Yc2 - Yb2$.

The position of the tire center O' can be determined by finding the point of intersection of the expressions of the two straight lines, which are an equal distance from the measurement points A and B and the measurement points B and C, respectively, based on the relationships of O'A=O'B and O'B=O'C.

Hence, $$X=(c2b1-c1b2)/(a1b2-a2b1)$$

$$Y=(c2a1-c1a2)/(a2b1-a1b2)$$

Thus, the values that are obtained by the above expressions represent the position of the tire center O' (X, Y).

In the present embodiment, the laser distance meters $3a$, $3b$, $3c$ are arranged as shown in FIG. 3 so as to simplify the calculation by the foregoing general expressions (X, Y) for finding the center of a circle.

Of the laser distance meters $3a$, $3b$, $3c$, the laser distance meter $3a$ is so arranged as to face the laser distance meter $4a$ of the outer surface measuring device 4 such that the extension of a straight line connecting the laser distance meter $3a$ and the laser distance meter $4a$ passes through the measurement origin O of the measuring table 1. Let the prolongation of the straight line be the x-axis, let the direction of the laser distance meter $4a$ seen from the measurement origin O be the positive direction of the x-axis, and let the straight line passing through the measurement origin O at right angles to the x-axis be the y-axis. Then, as shown in FIG. 3, the laser distance meter $3b$ and the laser distance meter $3c$ are located on the y-axis symmetrically to each other with respect to the x-axis. Thus, they are so arranged that their directions of measurement are respectively facing the inner surface of the tire.

The arrangement being as described above, the measurement point A, the measurement point B, and the measurement point C can be expressed as follows:

Measurement point A: A(Xa, Ya)=A(La, 0)
Measurement point B: B(Xb, Yb)=B(0, Lb)
Measurement point C: C(Xc, Yc)=C(0, -Lc)

Substituting the above conditions in the previously derived general expressions for finding the center of a circle, we have:

$$a1=2\times(Xa), b1=2\times(-Yb), c1=-Xa2+Yb2$$

$$a2=0, b2=2\times(Yb-Yc), c2=Yc2-Yb2$$

Hence, there results a simplification, and it is possible to find the tire center O' by substituting the above expressions into the following expressions:

$$X=(c2b1-c1b2)/(a1b2)$$

$$Y=(c2a1)/(-a1b2)$$

Hence, $$O'(X,Y)=O'((c2b1-c1b2)/(a1b2),(c2a1)/(-a1b2))$$

As described above, it is possible to make the items of calculation fewer than those of the general expressions. In particular, when calculated dimensions are to be used, the fewer the required number of calculations, the higher the accuracy of the result will be. Moreover, when the arrangement is such as shown in FIG. 6, the trigonometric functions have to be used in calculations. Therefore, it is more desirable to use an arrangement of the laser distance meters $3a$, $3b$, $3c$ as shown in FIG. 3 than to use the generalized computational formulas.

Using the above-described computational formulas, therefore, the tire center O' can be calculated from the measured values obtained by the laser distance meters $3a$, $3b$, $3c$. Thus, based on the results of the calculation, the dimensions of the tire T (FIG. 5) can be calculated by determining the distances of the measurement points from the newly determined tire center O' using the arithmetic processing unit 8.

Figure 9:
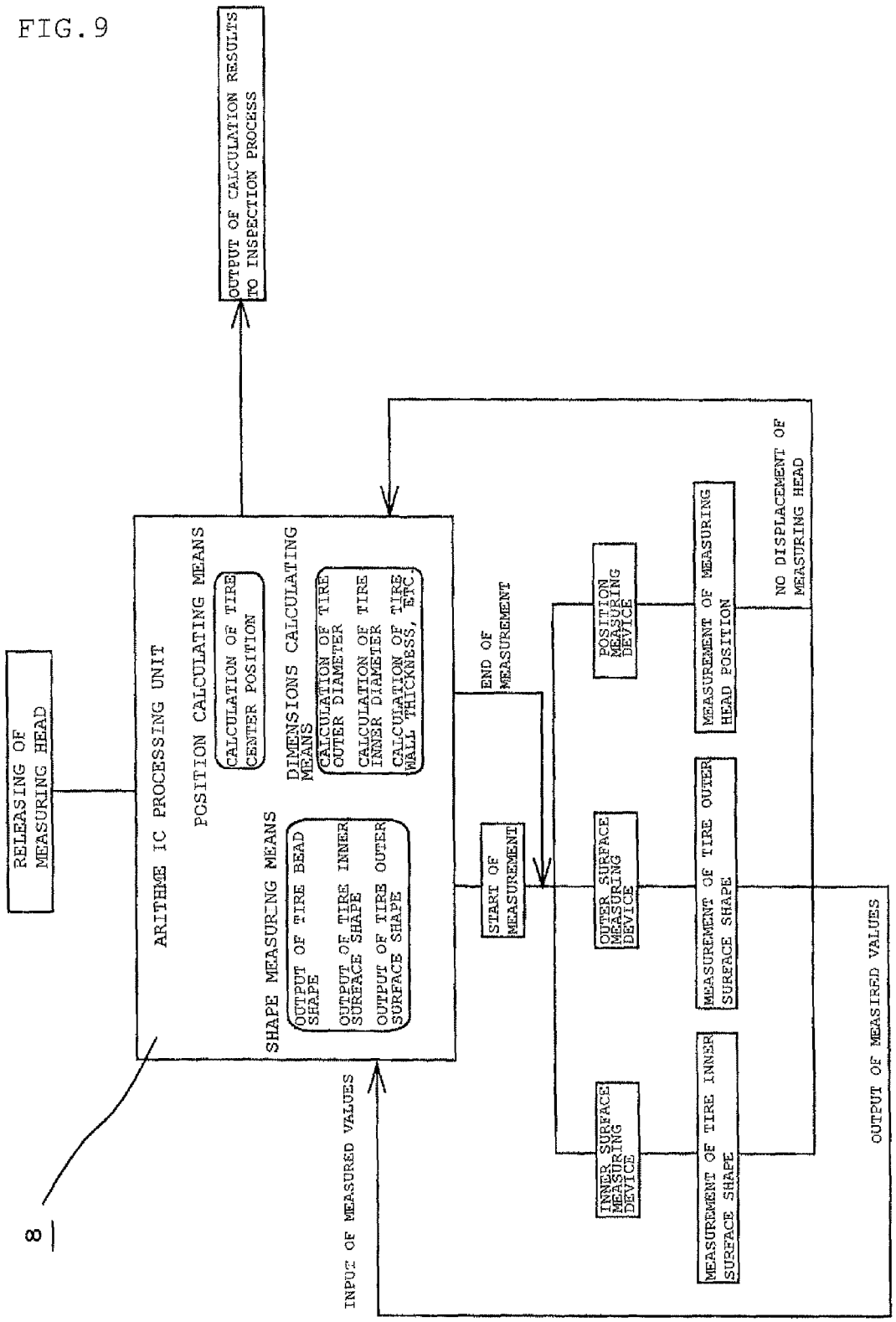
FIG. 9 is a flowchart of processings by an arithmetic processing unit.

FIG. 7 shows a concept of measurement of a tire T by an inner surface measuring device 3 and an outer surface measuring device 4. Also, FIG. 9 shows the flow of measurement processes in and around the arithmetic processing unit 8 from the start of measurement. The procedure of measurement will be explained below.

First, a measurer places a tire T on the placement surface $1a$ of the measuring table 1. At this stage, it is not necessary that the center O' of the tire T be brought in line with the measurement origin O. Next, the measurer pushes down the measuring head 2 from the measurement standby position to the measurement start position. At this time, the inner surface measuring device 3 installed on the measuring head 2 lowers down to the recess $1i$ in the measuring table 1 until it comes in contact with the lower stopper $1d$ at the measurement start position. As a result, the inner surface measuring device 3 and the outer surface measuring device 4 are positioned lower than the placement surface $1a$, so that it is possible to perform measurements from under the tire T.

As the measuring head 2 pushed down by the measurer reaches the measurement start position lower than the placement surface $1a$ of the measuring table 1, the switch $1f$ provided on the lower stopper $1d$ for starting the measurement is pressed down. Once pressed down, the switch $1f$ will be released, upon which the arithmetic processing unit 8 sends a signal for measurement start to all the laser distance meters $3a$, $3b$, $3c$, $4a$, and $6a$. This sets off the measurements in synchronism with each other.

With the measurer letting go of his hand in this state, the measuring head 2 rises gradually under the weight of the counter weight 5. Along with this rise, the inner surface measuring device 3 performs measurement of the side of the tire T in contact with the placement surface $1a$, the bead shape from the tire side, the shape of the inner surface thereof, and then the bead shape on the opposite side thereof by measuring distances thereto.

It should be understood that the accuracy of measurement by the laser distance meters $3a$, $3b$, $3c$, $4a$, and $6a$, which serve as the inner surface measuring device 3, the outer surface measuring device 4, and the height displacement measuring device 6, is determined by the speed of the measuring head 2 as it rises. Therefore, in consideration of the required accuracy of measurement, the rising speed of the measuring head 2 may be determined as appropriate by adjusting the weight of the counter weight 5 in balance with the measuring head 2.

Figure 8A:
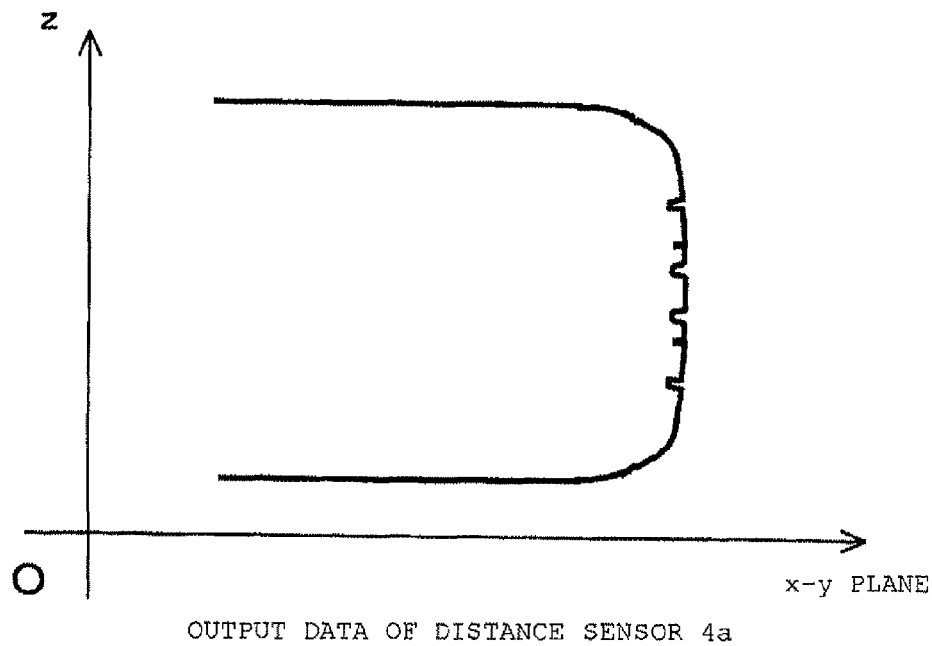
FIG. 8 is diagrams showing the results of measurement by an inner surface measuring device and an outer surface measuring device.
Figure 8B:
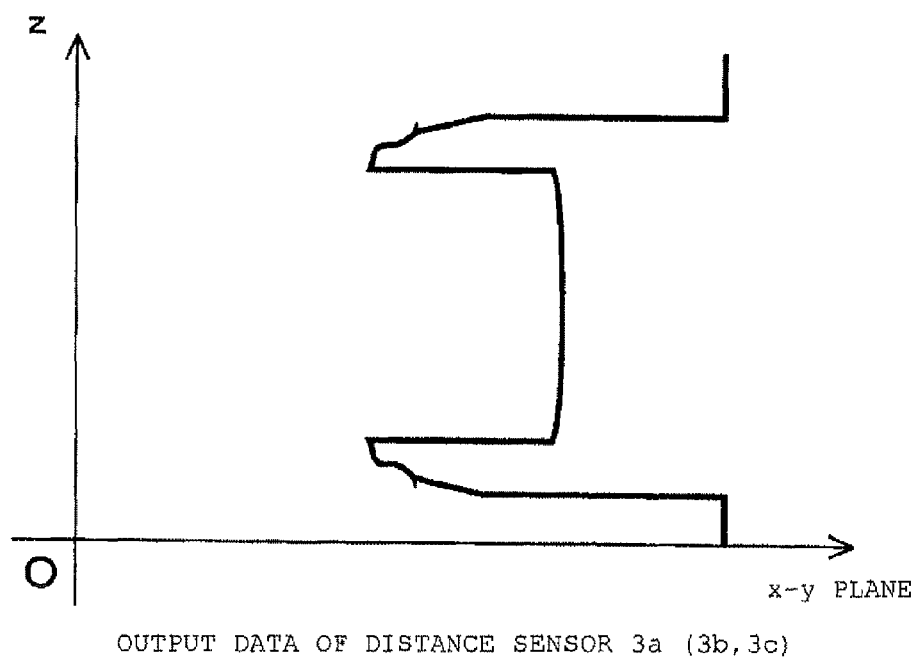

FIG. 8 shows the results of inner surface measurements outputted by a laser distance meter $3a$ or $3b$ or $3c$ and the results of outer surface measurements outputted by a laser distance meter $4a$.

From the measurements of the tire inner surface, the tire center O' is calculated by the position computational formulas stored in the arithmetic processing unit 8. Based on the calculated value, the inner tire diameter (T2×2) and the depth T8 of the tire are calculated. Also, since the position of the measurement point changes with the upward movement of the inner surface measuring device 3, it is possible to obtain the lateral cross-sectional shape of the tire at each of the measurement points A, B, and C. In this manner, the bead shape in parts where the tire T comes in close contact with the not-shown wheel can be measured. Further, the depth shape of the back surface of the tire tread area can be measured (see FIG. 8B).

On the other hand, the outer surface measuring device 4, along with the rise of the measuring head 2, measures the tire side to the shoulder region and the shape of the tread surface and also the shoulder region and the tire side on the opposite side thereof.

From the measurements of the outer surface of a tire by the outer surface measuring device 4, the shape of the tire surface can be measured (see FIG. 8a), and thus the tread surface width T5, the tire sectional width T4, and the total tire width T3 can be determined. Also, the relationship between the position of the laser distance meter 4a of the outer surface measuring device 4 and the measurement origin O is determined by the location of the laser distance meter 4a on the measuring head 2. Hence, the tire tread thickness T7 and the outer tire diameter (T1×2) at the measurement point A can be determined approximately by subtracting the distance La from the measurement origin O to the measurement point A and the distance Ld measured by the outer surface measuring device 4 from the distance from the measurement origin O to the outer surface measuring device 4. Further, the tire height T6 can be calculated from the calculated tire diameter and the inner tire diameter measured by the inner surface measuring device 3 (see FIG. 5).

The height displacement measuring device 6 translates the measured values obtained by the laser distance meters 3a, 3b, 3c, and 4a in the above-described measurements into the measurements in the tire width direction by making those measured values correspond to the change in the height direction.

The arithmetic processing unit 8 converts the measured values into predetermined output values by performing calculations on the measured values synchronously outputted from the laser distance meters 3a, 3b, 3c of the inner surface measuring device 3, the laser distance meter 4a of the outer surface measuring device 4, and the laser distance meter 6a of the height displacement measuring device 6, which accompany the displacement in the width direction of the tire T. The arithmetic processing unit 8 does this in time with the measurement, using the position and dimensions computational formulas stored therein. It is to be noted, however, that in the above-described measurements, the arithmetic processing unit 8 ignores measured values that are excessively variant.

Data concerning the tire center O' found by the computational formulas and the dimensions of the tire calculated or processed as described above are transferred to the inspection apparatus in the subsequent process.

Past the above-described processes and after completion of measurement by the measurement plane of the inner surface measuring device 3 and the outer surface measuring device 4 at the upper end side of the tire T, the measuring head 2 further rises until it comes to a stop in contact with the upper stopper 1e. As the change in the measured value of the laser distance meter 6a becomes zero with the stop of the measuring head 2, the arithmetic processing unit 8 sends a signal for measurement end to the inner surface measuring device 3, the outer surface measuring device 4, and the height displacement measuring device 6, thus completing the measurements of the tire T.

It should be understood by those skilled in the art that although in the above description of the present embodiments, both the dimensions and the shape of a tire are measured using both the calculating means and the shape measuring means, the arrangement may be such that only one of them is measured with either one of the means employed.

INDUSTRIAL APPLICABILITY

As described above, an apparatus according to the present invention can perform the measurements automatically of preselected dimensions, such as inner diameter, outer diameter and width, as well as the shape of an object which has an inner surface and an outer surface formed in cross section by circles around the center axis thereof. Such an object includes not only tires but also piping, flanges, and the like which have hollow interior. The present apparatus, which requires no electrical drive power except for a power source for the measuring devices, performs measurements quietly in a wide variety of locations.

REFERENCE NUMERALS 1 measuring table
1a placement surface
1b positioning guide
1c support post
1d lower stopper
1e upper stopper
1f switch
1g guide support stay
1h pulley stay
1i recess
1j support member
1k displacement measuring device support arm
1m upside stopper
1n downside stopper
2 measuring head
2a measuring head support shaft
2b outer surface measuring device support arm
2d non-measuring end
3 inner surface measuring device
3a laser distance meter
3b laser distance meter
3c laser distance meter
4 outer surface measuring device
4a laser distance meter
5 counter weight
5a wire rope
5b pulley
6 height displacement measuring device
6a laser distance meter
8 arithmetic processing unit
9 rail
10 measuring apparatus
20 measuring apparatus according to another embodiment
O measurement origin
O' tire center
T tire
T1 outer tire radius
T2 inner tire radius
T3 total tire width
T4 tire sectional width
T5 tire tread width
T6 tire height
T7 tire tread thickness
T8 tire depth
T9 rim contact surface width

The invention claimed is:

1. An apparatus for measuring a cylindrically-shaped object, comprising:
   a measuring head including a support shaft moving vertically with respect to a placement surface on which the object is placed;

an inner surface measuring device being held by the measuring head and having three first distance sensors disposed in such a manner that measuring directions are in same plane surface and are radial with respect to a shaft center of the support shaft, the inner surface measuring device measuring distance to a hollow inner surface of the object;

an outer surface measuring device being held by the measuring head, and having a second distance sensor disposed in such a manner that measuring direction is in the same plane as the measuring direction of the three first distance sensors and is opposed to any one of the measuring direction of the first distance sensor, for measuring distance from the second distance sensor to an outer surface of the object;

a displacement measuring device provided with a third distance sensor for measuring displacement of the measuring head in a height direction of the measuring head;

a position calculating means for calculating the center position of the object by calculating a center of circle connecting each of measurement point of the hollow inner surface of the object measured by the three first distance sensors so as to obtain a center of the object; and a shape measuring means for measuring a shape of the object from the center position of the object measured by the position calculating means and results of measurement by the inner surface measuring device, the outer surface measuring device, and the displacement measuring device.

2. The apparatus for measuring a cylindrically-shaped object according to claim 1 further comprising a dimension calculating means of calculating dimension of the object from the center position of the object calculated by the position calculating means and results of measurement by the outer surface measuring device and displacement measuring device.

3. The apparatus for measuring a cylindrically-shaped object according to claim 2, wherein the measuring direction of one of the first distance sensors opposes to the measuring direction of the second distance sensor and the measuring direction of the other first distance sensors are contrary to each other.

4. The apparatus for measuring a cylindrically-shaped object according to claim 3, wherein one of the first distance sensors whose measuring direction opposes to the measuring direction of the second distance sensor is arranged so as to be perpendicular to the other two first distance sensors.

5. The apparatus for measuring a cylindrically-shaped object according to claim 1, wherein the measuring direction of any one of the first distance sensors opposes to the measuring direction of the second distance sensor and the measuring direction of the other two first distance sensors are contrary to each other.

6. The apparatus for measuring a cylindrically-shaped object according to claim 5, wherein one of the first distance sensors whose measuring direction opposes to the measuring direction of the second distance sensor is arranged so as to be perpendicular to the other two first distance sensors.

7. A method for measuring a cylindrically-shaped object, comprising the steps of:

measuring distance from three first distance sensors to a hollow inner surface of the object by an inner surface measuring device which is held by a measuring head installed to a support shaft moving vertically with respect to a placement surface on which the object is placed and has the first distance sensors disposed in such a manner that measuring directions are in same plane surface and are radial with respect to the support shaft of the measuring head;

measuring distance from a second distance sensor to an outer surface of the object by an outer surface measuring device which is held by the measuring head, is disposed in the same plane as the inner surface measuring device and has a second distance sensor positioned at a predetermined distance outward from a region enclosed by the first distance sensors;

measuring displacement of the measuring head in a height direction by a displacement measuring device including a third distance sensor;

calculating the center position of the object by calculating a center of circle connecting each of measurement point of the hollow inner surface of the object measured by the three first distance sensors so as to obtain a center of the object; and measuring a shape of the object from the center position of the object measured by the position calculating means and results of measurement by the inner surface measuring device, the outer surface measuring device, and the displacement measuring device.

* * * * *